United States Patent [19]

Oyama et al.

[11] Patent Number: 4,910,267

[45] Date of Patent: Mar. 20, 1990

[54] OIL-RESISTANT AND ANTI-DEGRADING RUBBER ARTICLE

[75] Inventors: Motofumi Oyama, Yokosuka; Yoichiro Kubo, Yokohama; Toshiharu Honda, Kamakura, all of Japan

[73] Assignee: Nippon Zeon Co., Ltd., Tokyo, Japan

[21] Appl. No.: 157,140

[22] Filed: Feb. 10, 1988

Related U.S. Application Data

[63] Continuation of Ser. No. 690,812, Jan. 11, 1985, abandoned, which is a continuation of Ser. No. 452,621, Dec. 23, 1982, abandoned.

[30] Foreign Application Priority Data

Dec. 28, 1981 [JP] Japan ................................. 56-211898

[51] Int. Cl.$^4$ .............................................. C08C 19/20
[52] U.S. Cl. ..................................... 525/352; 525/348; 525/349
[58] Field of Search ................ 525/352, 348, 349, 342

[56] References Cited

U.S. PATENT DOCUMENTS

| | | | |
|---|---|---|---|
| 3,976,625 | 8/1976 | Starmer | 525/329.3 |
| 4,337,329 | 6/1982 | Kubo | 525/339 |
| 4,350,796 | 9/1982 | Oyama | 525/233 |
| 4,384,081 | 5/1983 | Kubo | 525/339 |
| 4,404,329 | 9/1983 | Maeda | 525/329.2 |
| 4,405,756 | 9/1983 | Oyama | 525/237 |

*Primary Examiner*—Christopher Henderson
*Attorney, Agent, or Firm*—Sherman and Shalloway

[57] ABSTRACT

An anti-degrading rubber article to be used in contact with a mineral oil containing an oil modifier, at least that surface of said rubber article which is to come into contact with said mineral oil being composed substantially of a vulcanization product, obtained by using a sulfur vulcanization system, of a copolymer rubber having polymer chains consisting of (1) 10 to 60% by weight of units derived from an unsaturated nitride,
(2) 2 to 30% by weight of units derived from a conjugated diene, and
(3) 88 to 10% by weight of units derived from a copolymerizable ethylenically unsaturated monomer other than the unsaturated nitride and/or units resulting from the hydrogenation of units derived from a conjugated diene.

7 Claims, No Drawings

OIL-RESISTANT AND ANTI-DEGRADING RUBBER ARTICLE

This application is a continuation of application Ser. No. 690,812, filed Jan. 11, 1985, now abandoned, which is a continuation of Ser. No. 452,621, filed Dec. 23, 1982, now abandoned.

This invention relates to rubber articles having excellent oil resistance and anti-degrading property which is suitable for use in contact with mineral oils containing oil modifiers such as load carrying additives and detergent-dispersants.

Mineral oils for use in internal combustion engines and various machines have incorporated therein less than about 20% by weight of load carrying additives for reducing friction during the operation of engines or machines thereby to increase the energy efficiency and also to prevent seizing, etc., or detergent-dispersants for minimizing harmful deposits chemically or mechanically formed as by-products as a result of the operation of engines or machine parts and cleaning metal surfaces such as pistons and cylinders and the mineral oils.

As the operating conditions for engines or machines become severer, mineral oils having the aforesaid oil modifiers added thereto are required to be used for a longer period of time, and consequently, sealing members such as gaskets and O-rings, and rubber materials such as belts used in contact with the mineral oils are adversely affected by the oil modifiers such as load carrying additives and detergent-dispersants contained in the mineral oils and undergo accelerating degradation. Accordingly, rubber materials composed mainly of an acrylonitrile-butadiene copolymer rubber heretofore used in this field have become no longer useful.

It is an object of this invention to provide a rubber article which can withstand long-term use even under the aforesaid circumstances.

According to this invention, as a rubber article meeting the above object, there is provided a rubber article which is composed, wholly or at a surface to be in contact with a mineral oil containing an oil modifier such as a load carrying additive or a detergent-dispersant, of a vulcanization product, obtained by using a sulfur vulcanization system, of a copolymer rubber having polymer chains consisting of (1) 10 to 60% by weight of units derived from an unsaturated nitrile,
(2) 2 to 30% by weight of units derived from a conjugated diene, and
(3) 88 to 10% by weight of units derived from a copolymerizable ethylenically unsaturated monomer other than the unsaturated nitrile and/or units resulting from the hydrogenation of units derived from a conjugated diene.

The rubber article of this invention can be used under severe conditions for a longer period of time than a conventional rubber article formed of a vulcanization product of NBR obtained with a sulfur vulcanization system when it is used in contact with oils having incorporated therein oil modifiers, for example load carrying additives such as organic sulfur compounds, organic halogen compounds, organic phosphorus compounds and organic metal salts, and/or detergent-dispersants such as long-chain alkenylsuccinimide compounds, long-chain alkenylsuccinate esters, long-chain alkenylphosphonic acid derivatives, polyalkylene glycol carbonates, polyalkylene glycol carbamates, sulfonates, phenates, salicylates, naphthenates, hydroxybenzylamine derivatives and multipolar polymers composed of units of an O- or N-containing vinyl monomer.

Load carrying additives as oil modifiers to be added to mineral oils are known per se, and include one or more of organic sulfur compounds, organic halogen compounds, organic phosphorus compounds and organic metal salts. Examples of the organic sulfur compounds include sulfides such as diphenyl disulfide, dibenzyl sulfide, didodecyl disulfide, and a diester disulfide such as an ester between a fatty acid and diethanol disulfide; sulfurized oils and fats such as sulfurized fatty acid esters, sulfurized sperm oil and sulfurized lard; sulfurized terpene and sulfurized olefins; xanthogen disulfides such as dibutyl xanthogen disulfide; and thiocarbonates such as a glycol ester of xanthogenic acid. Examples of the organic halogen compounds include chlorinated hydrocarbons such as chlorinated paraffins and chlorinated naphthalene; and chlorinated carboxylic acid derivatives such as methyl trichlorostearate, and pentachloropentadienic acid. Examples of the phosphorus compounds include phosphate such as tricresyl phosphate, monoamyl phosphate; amine derivatives of phosphates such as dodecylamine di-n-butyl phosphate and dibutylphosphorodibutyl amidate; and phosphites such as tributyl phosphite, dilauryl phosphite, and dilauryl hydrogen phosphite. Examples of the organic metal salts include lead soaps such as lead naphthenate and lead oleate; zinc salts of thiophosphoric acids such as zinc di-n-hexyldithiophosphate, zinc di-iso-hexyldithiophosphate and zinc diphenyldithiophosphate; metal salts such as lead salts and molybdenum salts; and zinc salts of thiocarbamic acids such as zinc dibutyldithiocarbamate.

The detergent-dispersants as oil modifiers to be added to mineral oils are known per se, and include N-substituted long-chain alkenylsuccinic acid derivatives represented by the following formula

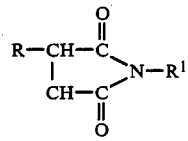

wherein R represents a polyolefin of about $C_{50}$–$C_{200}$, usually polyisobutylene and $R^1$ represents the group of the formula

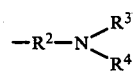

in which $R^2$ is a $C_{3-10}$ alkylene group, and each of $R^3$ and $R^4$ is a methyl, ethyl or propyl group, etc., the group of the formula

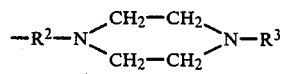

in which $R^2$ and $R^3$ are as defined, etc., such as N-ethylpolyisobutyl succinimide, N-dimethylaminopropyl polyisobutenyl succinimide, N-methylpiperazinetrimethylene polyisobutenyl succinimide, bis-N-diethylenetriamine polyisobutenyl succinimide or N-ethylaminoethanol polyisobutenyl succinimide; long-chain alkenylsuccinate esters such as dialkyl (methyl, ethyl, propyl, etc.) polyisobutenylsuccinates, neopentyl glycol polyisobutenylsuccinate and ethylene glycol polyisobutenylsuccinate; long-chain alkenylphosphonic acid derivatives, for example alkaline earth metal salts of a hydrolyzate of a reaction product between a polyolefin (mainly polyisobutene) and $P_2S_5$, such as a barium salt of a polyolefinphosphonic acid or a polyolefin thiophosphonic acid such as bis-polybutenylphosphonic acid sulfide; polyalkylene glycol carbonates represented by the general formula

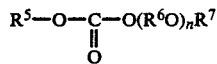

wherein $R^5$ represents a $C_{1-14}$ alkyl group, $R^6$ represents a $C_{1-3}$ alkylene group, $R^7$ represents a $C_{1-18}$ alkyl group, and n is an integer of 1 to 6, such as methyl triethylene glycol pentyl ether carbonate; polyalkylene glycol carbamates represented by the general formula

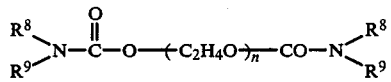

wherein $R^8$ and $R^9$ each represent hydrogen, a $C_{1-8}$ alkyl, alkenyl, alkynyl group, etc., and an represents an integer of 2 to 6, such as tetraethylene glycol dicarbamate; sulfonates, for example alkaline earth metal (Ca, Ba, etc.) salts of long-chain alkyl-substituted aromatic sulfonic acids such as dodecylbenzenesulfonic acid or petroleum-type sulfonic acids such as mahoganysulfonic acid; phenates such as the reaction products of alkylphenols such as tertiary octyl phenol, tertiary amyl phenol or amyl phenol/formaldehyde condensate or alkylphenol sulfides with alkaline earth metal (Ca, Ba, etc.) bases; salicylates which are the reaction products of salicylic acid with alkaline earth metal bases; naphthenates which are alkaline earth metal salts of carboxylic acids including cycloalkanes, such as calcium naphthenates and complex calcium salts of aromatic carboxylic acids (such as phthalic acid) and naphthenic acid; hydroxybenzylamine derivatives which are hydroxybenzyl-substituted amines, including those obtained by reacting alkyl($C_2$-$C_{12}$)phenols with polyamines such as ethylenediamine, propylenediamine, diethylenetriamine, tetraethylenepentamine, hexaethyleneheptamine or dipropylenepentamine in the presence of formaldehyde; and multipolar polymers composed of units of an O- or N-containing vinyl monomer, such as copolymers of higher alcohol esters of methacrylic acid and vinyl monomers having a hydrophilic group (e.g., copolymers of alkyl methacrylates with dimethylaminoethyl methacrylate, vinylpyridine or N-vinylpyrrolidone), and vinyl acetate/dialkyl fumarate/maleic anhydride copolymers.

These compounds are added, either singly or in combination, to a mineral oil in an amount of less than about 20% by weight.

The rubber article of this invention is composed, either wholly or at a surface to be in contact with the mineral oil, of the above-specified rubber containing an unsaturated nitrile.

The unsaturated nitrile-containing rubber used in this invention is a copolymer rubber containing in the polymer chain (1) units derived from the unsaturated nitrile, (2) units derived from a conjugated diene, and (3) units derived from an ethylenically unsaturated monomer other than the unsaturated nitrile and/or units resulting from hydrogenation of units derived from a conjugated diene. The proportion of the units (1) from the unsaturated nitrile in the rubber is 10 to 60% by weight. If it is less than 10% by weight, the resulting rubber has poor oil resistance. If it exceeds 60% by weight, the cold resistance of the rubber is reduced. The preferred proportion of the units (1) is 20 to 50% by weight. The proportion of the units (2) derived from the conjugated diene is 2 to 30% by weight. If it exceeds 30% by weight, the resulting rubber has poor resistance to degradation by oil modifiers. The preferred proportion is 2 to 20% by weight, and the more preferred proportion is 2 to 10% by weight. If it is less than 2% by weight, the resulting rubber is difficult to vulcanize with a sulfur vulcanization system. The proportion of the units (3) is 88 to 10% by weight. If it is less than 10% by weight, the resulting rubber is susceptible to degradation by oil modifiers. The preferred proportion of the units (3) is 80 to 35% by weight, and the more preferred proportion is 80 to 40% by weight.

The copolymer rubber used in this invention is a rubber obtained by partially hydrogenating the conjugated diene units of a copolymer rubber composed of an unsaturated nitrile and a conjugated diene; an unsaturated nitrile/conjugated diene/ethylenically unsaturated monomer copolymer rubber obtained by copolymerizing an unsaturated nitrile, a conjugated diene and an ethylenically unsaturated monomer copolymerizable therewith; and a rubber obtained by partially hydrogenating the conjugated diene units of a copolymer rubber composed of an unsaturated nitrile, a conjugated diene and an ethylenically unsaturated monomer.

Suitable monomers used in the production of the copolymer rubber of this invention include unsaturated nitriles such as acrylonitrile and methacrylonitrile; conjugated dienes such as butadiene, isoprene and 1,3-pentadiene; unsaturated carboxylic acid such as acrylic acid, methacrylic acid, itaconic acid and maleic acid; alkyl esters of the aforesaid carboxylic acids, such as methyl acrylate, 2-ethylhexyl acrylate and octyl acrylate; alkoxyalkyl acrylates such as methoxyethyl acrylate, ethoxyethyl acrylate and methoxyethoxyethyl acrylate; and ethylenically unsaturated monomers such as allyl glycidyl ether, vinyl chloroacetate, ethylene, butene-1 and isobutylene.

Specific examples of the copolymer rubber of this invention are hydrogenation products of butadiene-acrylonitrile copolymer rubber, isoprene-acrylonitrile copolymer rubber and butadiene-isoprene-acrylonitrile copolymer rubber; butadiene-methyl acrylate-acrylonitrile copolymer rubber and a hydrogenation product thereof; butadiene-acrylic acid-acrylonitrile copolymer rubber and a hydrogenation product thereof; and butadiene-ethylene-acrylonitrile copolymer rubber and a hydrogenation product thereof.

The sulfur vulcanization system used in this invention is a combination of sulfur or a sulfur-donating compound or both as a vulcanizer with a vulcanization accelerator.

The sulfur-donating compound denotes a sulfur-containing organic compound capable of releasing active sulfur under heat. Examples include thiuram compounds such as tetramethylthiuram disulfide, tetraethylthiuram disulfide and dipentamethylenethiuram tetrasulfide, morpholine disulfide, 2-(4-morpholinodithio)- benzothiazole, selenium dimethyldithiocarbamate, selenium diethyldithiocarbamate, alkylphenol disulfides, and aliphatic polysulfurized polymers.

Any vulcanization accelerators can be used in this this invention which, when used in combination with the aforesaid vulcanizer, can give a vulcanizate of the unsaturated nitrile-containing rubber in accordance with this invention. Such vulcanization accelerators include, for example, guanidine-type accelerators such as diphenyl guanidine; thiazole-type accelerators such as mercapto benzothiazole and dibenzothiazyl disulfide; sulfenamide-type accelerators such as N-cyclohexyl-2-benzothiazyl sulfenamide and N,N'-dicyclohexyl-2-benzothiazyl sulfenamide; thiuram-type accelerators such as tetramethylthiuram monosulfide and tetramethylthiuram disulfide; and dithio acid salt-type accelerators such as zinc dimethyldithiocarbamate.

The vulcanization system usually contains a metal oxide such as zinc oxide and magnesium oxide and a vulcanization aid such as stearic acid, oleic acid and zinc stearate, in addition to the vulcanizer and the vulcanization accelerator.

The amount of the vulcanizer (sulfur and/or the sulfur-donating compound) used in this invention is usually 0.3 to 3 parts by weight, preferably 0.8 to 2.5 parts by weight, more preferably 1.0 to 1.5 parts by weight, as sulfur per 100 parts by weight of rubber.

The rubber article of this invention is produced by kneading the aforesaid copolymer rubber, either alone or, without departing from the spirit and scope of this invention, with another rubber, and conventional compounding agents including a filler, a reinforcing agent, a plasticizer and an antioxidant to form a rubber compound, molding it into a desired shape such as a sheet, hose, tube or belt by using a conventional molding machine, and vulcanizing the molded article by such vulcanizing means as press vulcanization or oven cure.

Specific examples of the form of the rubber article of this invention are sealing articles such as gaskets or O-ring, hoses and belts. These examples are not limitative, and the present invention encompasses all rubber articles which are to be used in contact with mineral oils containing load carrying additives and detergent-dispersants as oil modifiers.

The following examples illustrate the present invention in detail.

EXAMPLE 1

An acrylonitrile-butadiene copolymer rubber (bound acrylonitrile content 37% by weight; to be abbreviated NBR hereinafter) was subjected to a hydrogenation treatment in solution in the presence of a Pd-carbon catalyst to hydrogenate the butadiene units and thereby to give a partially hydrogenated NBR having a degree of hydrogenation of 90%.

In each run, 100 parts by weight of the partially hydrogenated NBR were mixed on a 6-inch roll mill with 5 parts by weight of zinc oxide (No. 3), 1 part by weight of stearic acid, 40 parts by weight of FEF carbon black, 1 part by weight of octylated diphenylamine and 1 part by weight of N-phenyl-N'-isopropyl-p-phenylenediamine and each of the vulcanization systems indicated in Table 1 to form a rubber compound. The compound was press-cured at 160° C. for 20 minutes to prepare a sheet having a thickness of 2 mm.

Ten percent by weight of each of the additives (load carrying additives or detergent-dispersants) indicated in Table 2 were added to ASTM No. 2 oil and the mixture was heated to 150° C. The rubber sheet obtained as above was dipped in the heated oil, and its change with the lapse of time was observed. After dipping for 7 days, the tensile strength of the rubber sheet in a swollen state was measured, and is shown in Table 2 as an index taken against the tensile strength of the sample measured in a swollen state after dipping for 7 days in the aforesaid mineral oil containing no additive. The tensile strength of the latter is taken as 100.

TABLE 1

| Sulfur vulcanization system (parts by weight) | Comparison NBR (*1) | | | Invention Partially hydrogenated NBR (*2) | | | | | | | | | | |
|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 |
| Sulfur | 1.5 | 0.5 | | | 0.3 | 0.5 | 0.5 | 0.5 | 1.0 | 1.5 | 1.5 | 1.5 | 3.0 | 5.0 |
| Dibenzothiazyl disulfide | 1.5 | | | | | | | | | | 1.5 | 1.5 | 1.5 | 1.5 | 1.5 |
| Benzothiazyl disulfide | | | | | | | | | | | | | | |
| Diphenyl guanidine | | | | | | | | | | | 0.3 | | | |
| Tetramethylthiuram monosulfide | | | | | | | | | | | | 0.5 | 0.5 | 0.5 |
| Tetramethylthiuram disulfide | | 2.0 | 2.0 | 2.0 | 0.7 | | 2.0 | 2.0 | 0.7 | | | | | |
| Tetraethylthiuram disulfide | | | | | | | | | 0.7 | 0.3 | | | | |
| N-cyclohexyl-2-benzothiazyl sulfenamide | | | | | | | 1.0 | | | | | | | |
| N-oxydiethylene-2-benzothiazyl sulfenamide | | | | | | | | | | 2.5 | | | | |
| 2-Mercaptobenzothiazole | | 0.5 | 0.5 | 0.5 | | | 0.5 | 0.5 | | | | | | |
| Morpholine disulfide | | | 2.0 | 2.0 | 1.0 | | | | | | | | | |
| Tellurium diethyldithiocarbamate | | | | | | | | 0.5 | | | | | | |
| Dipentamethylenethiuram hexasulfide | | | | | 0.7* | | | | | | | | | |
| Zinc dimethyldithiocarbamate | | | | | | 0.5 | | | | | | | | |
| Zinc di-n-butyldithiocarbamate | | | | | | 0.5 | | | | | | | | |

(*1): Nipol 1042 (a product of Japanese Zeon Co., Ltd.; bound acrylonitrile 33% by weight).
(*2): Bound acrylonitrile 37% by weight; degree of hydrogenation 90%.

TABLE 2

| Additive | Comparison | | | Invention | | | | | | | | | | |
|---|---|---|---|---|---|---|---|---|---|---|---|---|---|---|
| Run No. | 1 | 2 | 3 | 4 | 5 | 6 | 7 | 8 | 9 | 10 | 11 | 12 | 13 | 14 |
| Not added | 100 | 100 | 100 | 100 | 100 | 100 | 100 | 100 | 100 | 100 | 100 | 100 | 100 | 100 |

TABLE 2-continued

| | Comparison | | | Invention | | | | | | | | | | |
|---|---|---|---|---|---|---|---|---|---|---|---|---|---|---|
| | | | | | | | Run No. | | | | | | | |
| Additive | 1 | 2 | 3 | 4 | 5 | 6 | 7 | 8 | 9 | 10 | 11 | 12 | 13 | 14 |
| Sulfurized olefin | 57 | 55 | 54 | 94 | 95 | 92 | 92 | 96 | 96 | 94 | 95 | 92 | 87 | 76 |
| Chlorinated paraffin | 79 | 75 | 75 | 100 | 104 | 105 | 103 | 102 | 102 | 92 | 102 | 99 | 89 | 78 |
| Tricresyl phosphate | 72 | 76 | 76 | 104 | 109 | 104 | 103 | 101 | 98 | 96 | 99 | 101 | 96 | 91 |
| Lead naphthenate | 76 | 80 | 78 | 110 | 106 | 108 | 109 | 107 | 103 | 99 | 100 | 98 | 94 | 92 |
| Zinc di-n-hexyldithiophosphate | 24 | 22 | 24 | 94 | 98 | 91 | 95 | 92 | 101 | 92 | 94 | 96 | 82 | 76 |
| Zinc dibutyldithiocarbamate | 30 | 27 | 29 | 99 | 98 | 98 | 100 | 103 | 100 | 94 | 99 | 98 | 84 | 73 |
| N-ethylpolyisobutenyl-succinimide | 73 | 75 | 74 | 101 | 104 | 100 | 102 | 103 | 102 | 96 | 101 | 102 | 89 | 90 |
| Neopentyl glycol polyisobutenylsuccinate | 80 | 82 | 84 | 102 | 104 | 106 | 105 | 107 | 96 | 100 | 99 | 101 | 94 | 85 |
| Tetraethylene glycol dicarbamate | 83 | 88 | 79 | 98 | 102 | 101 | 100 | 103 | 93 | 100 | 98 | 95 | 95 | 84 |
| Triethylene glycol pentyl ether carbonate | 72 | 78 | 75 | 92 | 93 | 94 | 90 | 94 | 96 | 94 | 92 | 94 | 76 | 82 |
| Polyalkenylsuccinimide | 75 | 64 | 62 | 98 | 100 | 99 | 100 | 99 | 98 | 100 | 99 | 98 | 95 | 88 |
| Calcium sulfonate | 84 | 83 | 81 | 89 | 95 | 91 | 95 | 92 | 91 | 92 | 94 | 96 | 90 | 85 |
| Calcium phenate | 41 | 37 | 35 | 97 | 99 | 100 | 102 | 96 | 99 | 104 | 100 | 100 | 90 | 81 |
| Monoalkene thiophosphonate compound | 33 | 29 | 24 | 92 | 93 | 95 | 95 | 92 | 92 | 95 | 96 | 93 | 92 | 92 |
| Benzylamine compound | 41 | 44 | 43 | 98 | 98 | 99 | 100 | 99 | 98 | 99 | 100 | 98 | 91 | 78 |

EXAMPLE 2

One hundred parts by weight of each of four partially hydrogenated acrylonitrile-butadiene rubbers (having a bound acrylonitrile content of 37% by weight and a degree of hydrogenation of 45%, 70% and 90% respectively and having a bound acrylonitrile content of 45% by weight and a degree of hydrogenation of 90%) and butadiene-acrylonitrile-butyl acrylate rubber (NBAR for short) was kneaded in accordance with the same compounding recipes as in Example 1 except that 0.5 part by weight of sulfur, 2 parts by weight of tetramethylthiuram disulfide, and 0.5 part by weight of mercaptobenzothiazole were used as the sulfur vulcanization system. The resulting rubber compound was press-cured at 160° C. for 20 minutes to prepare a sheet having a thickness of 2 mm.

Each of the load-carrying additives shown in Table 3 was added in an amount of 2 to 10% by weight to ASTM No. 2 oil, and the mixture was heated to 150° C. The resulting rubber sheet was dipped in the heated oil for 45 days at the longest. The number of days which elapsed until the sample developed cracks when bent through 180° in a swollen state was determined. The results are shown in Table 3.

TABLE 3

| | | Comparison | | | Invention | | | |
|---|---|---|---|---|---|---|---|---|
| | | Run No. | | | | | | |
| | | 1 | 2 | 3 | 4 | 5 | 6 | 7 |
| Load-carrying additive Compound | Amount (wt. %) | NBR (*5) | NBR (*6) | NBR (*10) | NBR (*7) | NBAR (*11) | NBR (*8) | NBR (*9) |
| Not added | 0 | 14 | 21 | 21 | NC | NC | NC | NC |
| Diphenyl disulfide | 2 | 14 | 14 | 14 | NC | NC | NC | NC |
| Sulfurized olefin (*1) | 10 | 3 | 3 | 3 | 28 | NC | NC | NC |
| Sulfurized olefin (*2) | 10 | 10 | 10 | 10 | NC | NC | NC | NC |
| Sulfurized sperm oil (*3) | 10 | 7 | 10 | 10 | NC | NC | NC | NC |
| Dibutylxanthogen disulfide | 2 | 14 | 14 | 14 | NC | NC | NC | NC |
| Chlorinated paraffin (*4) | 10 | 3 | 3 | 5 | NC | 28 | NC | NC |
| Tricresyl phosphate | 10 | 10 | 10 | 14 | NC | NC | NC | NC |
| Di-n-octylamine-dibutyl phosphate | 10 | 10 | 14 | 14 | NC | NC | NC | NC |
| Dilauryl hydrogen phosphite | 10 | 14 | 14 | 14 | NC | NC | NC | NC |
| Triphenyl phosphite | 10 | 10 | 10 | 14 | NC | NC | NC | NC |
| Lead naphthenate | 10 | 10 | 14 | 14 | NC | NC | NC | NC |
| Zinc di-n-hexyldithiophosphoric acid | 5 | 7 | 10 | 10 | NC | NC | NC | NC |
| Zinc di-iso-hexyldithio-phosphate | 5 | 10 | 10 | 10 | NC | NC | NC | NC |
| Zinc dibutyldithiocarbamate | 2 | 10 | 21 | 21 | NC | NC | NC | NC |

In Table 3, NC shows that no occurrence of cracks was noted in the dipping test for 45 days.

Other notes to Table 3 are as follows:

(*1): EO-53 (a product of Nippon Cooper Co., Ltd.)
(*2): DAILUBE S-110 (a product of Dainippon Ink and Chemicals, Inc.)
(*3): DAILUBE S-410 (a product of Dainippon Ink and Chemicals, Inc.
(*4): ADK CIZER E450 (a product of Adeka Argues Chemical Co., Ltd.)
(*5): Acrylonitrile-butadiene copolymer rubber, Nipol 1042 (a product of Nippon Zeon Co., Ltd.; bound acrylonitrile content 33% by weight)
(*6): Same as above (bound acrylonitrile content 37% by weight, degree of hydrogenation 45%)
(*7): Same as above (bound acrylonitrile content 37% by weight, degree of hydrogenation 70%)

(*8): Same as above (bound acrylonitrile content 37% by weight, degree of hydrogenation 90%)
(*9): Same as above (bound acrylonitrile content 45% by weight, degree of hydrogenation 90%)
(*10): Butadiene-acrylonitrile-butyl acrylate (35/30/35% by weight) copolymer rubber
(*11): Same copolymer rubber (5/60/35% by weight)

EXAMPLE 3

Example 2 was repeated except that each of the detergent-dispersants indicated in Table 4 was added in an amount of 10% by weight to ASTM No. 2 oil instead of each of the load-carrying additives used in Example 2. The results are shown in Table 4.

TABLE 4

| | Comparison | | | Invention | | | |
|---|---|---|---|---|---|---|---|
| | \multicolumn{7}{c}{Run No.} | | | | | | |
| | 1 | 2 | 3 | 4 | 5 | 6 | 7 |
| Detergent-dispersant | NBR | NBR | NBAR | NBR | NBAR | NBR | NBR |
| Compound | (*5) | (*6) | (*10) | (*7) | (*11) | (*8) | (*9) |
| Not added | 14 | 21 | 21 | NC | NC | NC | NC |
| Lauryl methacrylate-vinylpyridine-methacrylamide copolymer | 12 | 14 | 21 | NC | NC | NC | NC |
| Dodecyl methacrylate-ethylene glycol-methacrylate copolymer | 12 | 14 | 21 | NC | NC | NC | NC |
| N-ethylpolyisobutenylsuccinimide | 10 | 10 | 10 | NC | NC | NC | NC |
| N-dimethylaminopropylpolyisobutenylsuccinimide | 10 | 10 | 10 | NC | NC | NC | NC |
| N-methylpiperazinetrimethylenepolyisobutenylsuccinimide | 10 | 10 | 10 | NC | NC | NC | NC |
| bis-N-Diethylenetriaminepolyisobutenylsuccinimide | 10 | 10 | 10 | NC | NC | NC | NC |
| N-ethylaminoethanolpolyisobutenylsuccinimide | 12 | 14 | 14 | NC | NC | NC | NC |
| Dimethyl polyisobutenylsuccinimide | 14 | 21 | 21 | NC | NC | NC | NC |
| Neopentyl glycol polyisobutenylsuccinate | 12 | 14 | 14 | NC | NC | NC | NC |
| bis-Polybutenylphosphonic acid sulfide | 10 | 10 | 14 | NC | NC | NC | NC |
| Triethylene glycol pentyl ether methyl carbonate | 12 | 14 | 14 | NC | NC | NC | NC |
| Tetraethylene glycol dicarbamate | 12 | 14 | 14 | NC | NC | NC | NC |
| Polymeric carboxylic acid ester (*12) | 12 | 14 | 14 | NC | NC | NC | NC |
| Polyalkenylsuccinimide (*13) | 12 | 14 | 14 | NC | NC | NC | NC |
| Polyalkenylsuccinimide (*14) | 10 | 14 | 14 | NC | NC | NC | NC |
| Calcium sulfonate (*15) | 10 | 14 | 14 | NC | NC | NC | NC |
| High base calciumsulfonate (*16) | 10 | 14 | 14 | NC | NC | NC | NC |
| Calcium phenate (*17) | 10 | 10 | 10 | NC | NC | NC | NC |
| Calcium alkylsalicylate (*18) | 12 | 14 | 14 | NC | NC | NC | NC |
| Calcium napthenate (*19) | 12 | 14 | 14 | NC | NC | NC | NC |
| Magnesium sulfonate (*20) | 10 | 10 | 10 | NC | NC | NC | NC |
| Barium sulfonate (*21) | 10 | 10 | 10 | NC | NC | NC | NC |
| Monoalkenethiophosphonate compound (*22) | 10 | 10 | 10 | NC | NC | NC | NC |
| Sulfurized alkyl phenate (*23) | 10 | 12 | 14 | NC | NC | NC | NC |
| Benzylamine compound (*24) | 10 | 12 | 14 | NC | NC | NC | NC |

In Table 4, NC shows that during dipping for 45 days, no crack occurred in the sample when it was bent through 180° in a wet condition.

Notes (*5) to (*11) are the same as the footnotes to Table 3. Other notes are as follows:

(*12): Lubrizol 938 (a product of Japan Lubrizol Corp.)
(*13): Lubrizol 894 (a product of Japan Lubrizol Corp.)
(*14): HITEC E-638 (a product of Nippon Cooper Co., Ltd.)
(*15): Lubrizol 52 (a product of Japan Lubrizol Corp.)
(*16): Lubrizol 56 (a product of Japan Lubrizol Corp.)
(*17): AMOCO 9230 (a product of Amoco Chemicals Far East Inc.)
(*18): SAP 001 (a product of Shell KAGAKU K.K.)
(*19): SAP 011 (a product of Shell KAGAKU K.K.)
(*20): AMOCO 9217 (a product of Amoco Chemicals Far East Inc.)
(*21): HITEC E-631 (a product of Nippon Cooper Co., Ltd.)
(*22): TC5986 (a product of TEXACO Chemical Co.)
(*23): TLA 320 (a product of TEXACO Chemical Co.)
(*24): AMOCO 9250 (a product of AMOCO Chemicals Far East Inc.)

What is claimed is:

1. A method of preventing degradation of rubber articles caused by load-carrying additives or detergent-dispersants contained in a mineral oil when the rubber articles are in contact with the mineral oil containing said load-carrying additives or detergent-dispersants for an extended period which method comprises forming at least the surface of said rubber article from a sulfur-vulcanized product of a copolymer rubber having polymer chains consisting of:

(1) 20 to 50% by weight of units derived from an unsaturated nitrile selected from the group consisting of acrylonitrile and methacrylonitrile;
(2) 2 to 20% by weight of units derived from a conjugated diene selected from the group consisting of butadiene, isoprene and 1,3-pentadiene; and
(3) 78 to 40% by weight of at least one member of the group consisting of units derived from unsaturated carboxylic acids, alkyl esters of unsaturated carboxylic acids, alkoxy alkyl acrylates, allyl glycidyl ether, vinyl chloroacetate, ethylene, butene-1 and isobutylene and units resulting from the hydrogenation of units derived from a conjugated diene, whereby the resistance to degradation of the rubber article due to said load-carrying additives or detergent-dispersants is such that the rubber articles can be dipped in the mineral oil containing load-carrying additive or detergent-dispersant at a temperature of 150° C. for at least 28 days before the rubber article in the swollen state, when bent through 180° will develop cracks, and contacting at least the surface of the rubber article with said mineral oil containing load-carrying additives or detergent-dispersants.

2. The method of claim 1 wherein the oil modifier is a load-carrying additive, a detergent-dispersant, or both.

3. The method of claim 2 wherein the oil modifier is the load-carrying additive which is at least one compound selected from the group consisting of organic sulfur compounds, organic halogen compounds, organic phosphorus compounds and organic metal compounds.

4. The method of claim 2 wherein the oil modifier is the detergent-dispersant which is at least one compound selected from the group consisting of long-chain alkenylsuccinimide compounds, long-chain alkenylsuccinic acid esters, long-chain alkenylphosphonic acid derivatives, polyalkylene glycol carbonates, polyalkylene glycol carbamates, sulfonates, phenates, salicylates, naphthenates, hydroxybenzylamine derivatives and multipolar polymers composed of units of O- or N-containing vinyl monomers.

5. The method of claim 1 wherein the units (3) are selected from the group consisting of acrylic acid, methacrylic acid, itaconic acid, maleic acid, methyl acrylate, 2-ethylhexyl acrylate, octyl acrylate, methoxyethyl acrylate, ethoxyethyl acrylate, methoxyethoxyethyl acrylate, allyl glycidyl ether, vinyl chloroacetate, ethylene, butene-1 and isobutylene.

6. The method of claim 1 wherein the units (3) derived from a copolymerizable ethylenically unsaturated monomer are units resulting from the hydrogenation of units derived from a conjugated diene.

7. The method of claim 1 wherein the copolymer rubber is a rubber selected from the group consisting of an hydrogenated butadiene-acrylonitrile copolymer rubber, an hydrogenated isoprene-acrylonitrile copolymer rubber, an hydrogenated butadiene-isoprene-acrylonitrile copolymer rubber, butadiene-methylacrylate-acrylonitrile copolymer rubber, an hydrogenation product of a butadiene-methylacrylate-acrylonitrile copolymer rubber, butadiene-acrylic acid-acrylonitrile copolymer rubber, butadiene-butylacrylate-acrylonitrile copolymer rubber, an hydrogenation product of a butadiene-acrylic acid acrylonitrile copolymer rubber, butadiene-ethylene-acrylonitrile copolymer rubber, and an hydrogenation product of a butadiene-ethylene-acrylonitrile copolymer rubber.

* * * * *